(12) United States Patent
Hirama

(10) Patent No.: US 11,125,000 B2
(45) Date of Patent: Sep. 21, 2021

(54) URGING STRUCTURE FOR LID

(71) Applicant: NIFCO INC., Yokosuka (JP)

(72) Inventor: Taku Hirama, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 16/638,286

(22) PCT Filed: Aug. 20, 2018

(86) PCT No.: PCT/JP2018/030624
§ 371 (c)(1),
(2) Date: Feb. 11, 2020

(87) PCT Pub. No.: WO2019/039423
PCT Pub. Date: Feb. 28, 2019

(65) Prior Publication Data
US 2020/0173215 A1   Jun. 4, 2020

(30) Foreign Application Priority Data
Aug. 25, 2017   (JP) .............................. JP2017-161817

(51) Int. Cl.
*E05F 1/08* (2006.01)
*E05F 1/12* (2006.01)
*B60K 15/05* (2006.01)

(52) U.S. Cl.
CPC ................ *E05F 1/12* (2013.01); *B60K 15/05* (2013.01); *B60K 2015/053* (2013.01); *E05Y 2201/414* (2013.01); *E05Y 2900/534* (2013.01)

(58) Field of Classification Search
CPC ......... Y10T 16/53815; Y10T 16/53822; Y10T 16/53826; Y10T 16/5383; Y10T 16/53836;
(Continued)

(56) References Cited

U.S. PATENT DOCUMENTS 1,634,358 A * 7/1927 Hobson ................. F24C 15/023
                                                126/191
3,103,693 A * 9/1963 Tenniswood .......... E05F 1/1276
                                                16/289
(Continued)

FOREIGN PATENT DOCUMENTS

DE              952769 C      11/1956
DE       102015212838 A1      1/2017
(Continued)

OTHER PUBLICATIONS

PCT/ISA/210, "International Search Report for International Application No. PCT/JP2018/030624," dated Nov. 20, 2018.
(Continued)

*Primary Examiner* — Chuck Y Mah
(74) *Attorney, Agent, or Firm* — Manabu Kanesaka

(57) ABSTRACT

An urging structure for a lid includes a spring member having one spring end linked to a supply-port-forming member and the other spring end linked to a lid, and provided so as to be most elastically deformed at an intermediate position between a closed position and a maximum open position of the lid to urge the lid. The spring member is linked to the lid in such a way so as to vary a distance between the other spring end and a turning center of the lid, and the distance stays constant when the lid is in the closed position and in the intermediate position, increases in a process of moving from the intermediate position to the maximum open position, and becomes maximum when the lid is in the maximum open position.

2 Claims, 10 Drawing Sheets

(58) Field of Classification Search
CPC .......... Y10T 16/53848; Y10T 16/5389; B60K 15/05; B60K 2015/053; B60K 2015/0515; B60K 2015/0569; E05Y 2201/414; E05Y 2201/422; E05Y 2201/424; E05Y 2201/426; E05Y 2900/534
See application file for complete search history.

(56) References Cited

U.S. PATENT DOCUMENTS

| | | | | | |
|---|---|---|---|---|---|
| 3,785,006 | A | * | 1/1974 | Metz | E05F 1/1284 16/293 |
| 3,906,587 | A | * | 9/1975 | Little | E05F 1/1261 16/289 |
| 4,406,379 | A | * | 9/1983 | Anderson | B65D 43/24 138/156 |
| 4,527,825 | A | * | 7/1985 | Clouse | B60K 15/05 16/287 |
| 4,782,978 | A | * | 11/1988 | Appleby | B60K 15/05 220/DIG. 33 |
| 4,971,382 | A | * | 11/1990 | Ohno | B60K 15/05 16/291 |
| 5,272,789 | A | * | 12/1993 | Mitchell | E05F 1/1284 16/278 |
| 5,488,757 | A | * | 2/1996 | Cohen | E05F 1/1075 16/280 |
| 5,896,619 | A | * | 4/1999 | Koopman | E05F 1/1253 16/50 |
| 7,566,089 | B2 | * | 7/2009 | Alfaro | B60K 15/05 280/853 |
| 7,900,320 | B2 | * | 3/2011 | Katsumata | G03G 15/60 16/286 |
| 7,946,017 | B2 | * | 5/2011 | Brown | E05D 11/1042 29/426.6 |
| 8,407,858 | B2 | * | 4/2013 | Ahn | G06F 1/1681 16/286 |
| 8,820,561 | B2 | * | 9/2014 | Bauer | B60K 15/05 220/86.2 |
| 9,227,509 | B1 | * | 1/2016 | Jones | B60K 15/05 |

FOREIGN PATENT DOCUMENTS

| | | |
|---|---|---|
| EP | 0806317 A1 | 11/1997 |
| JP | 2004-9809 A | 1/2004 |
| JP | 2006-264513 A | 10/2006 |
| JP | 3959074 B2 | 8/2007 |
| JP | 2014-121985 A | 7/2014 |
| JP | 2016193675 A * | 11/2016 |

OTHER PUBLICATIONS

European Patent Office, "Search Report for European Patent Application No. 18848794.6," dated May 3, 2021.

* cited by examiner

URGING STRUCTURE FOR LID

FIELD OF TECHNOLOGY

The present invention relates to an improvement of an urging structure for a lid.

BACKGROUND ART

There is a structure of urging a fuel filler lid pivotally supported by an adapter forming a fuel filling aperture of an automobile to be openable and closable in an opening direction and a closing direction by sandwiching a neutral position between an open position and a closed position by a snapping member (see Patent Document 1).

In such a structure, in the open position, it is desirable to apply a torque as large as possible toward the opening direction relative to the lid so that the lid does not easily move to the closed position only by some unexpected external force applied to the lid. When a large urging force of the snapping member is applied, a holding state of the lid in the open position can be strengthened; however, simply, in such a case, a closing operation of the lid becomes difficult to be carried out, and after exceeding the neutral position, the lid is closed suddenly. When this occurs, an impact sound is generated, and the like so as to damage a high-quality feeling of the automobile, and the like.

PRIOR ART DOCUMENT

Patent Document

Patent Document 1: Japanese Patent No. 3959074

SUMMARY OF THE INVENTION

Problems to be Solved by the Invention

A main object of the present invention is that while ensuring a large torque relative to this type of lid in a maximum open position, a situation wherein the lid is suddenly closed is prevented from occurring as little as possible by reducing the torque at a time of the closing operation of the lid.

Means for Solving the Problems

In order to obtain the aforementioned object, in the present invention, an urging structure for a lid turnably combined relative to a supply-port-forming member provided in an automobile and forming an energy supply port, and closing the supply port in a closed position, includes a spring member having one spring end linked to the supply-port-forming member and the other spring end linked to the lid, and provided in such a way so as to be most elastically deformed at an intermediate position between the closed position and a maximum open position of the lid to urge the lid. Also, the spring member is linked to the lid in such a way so as to vary a distance between the other spring end and a turning center of the lid, and the aforementioned distance stays constant when the lid is in the closed position and in the intermediate position, increases in a process of moving from the intermediate position to the maximum open position, and becomes maximum when the lid is in the maximum open position.

According to such a structure, the distance becomes maximum at the maximum open position, so that in the maximum open position, a torque to be applied to the lid is maximized, and in the maximum open position, the lid can be set such that the lid cannot easily move to the closed position only by some unexpected external force applied to the lid.

On the other hand, by carrying out a closing operation of the lid located in the maximum open position, the distance can be reduced, thereby, the torque of the spring member between the intermediate position and the closed position can be reduced, so that at a time of the closing operation of the lid, the lid can be set such that the lid cannot be suddenly closed.

In one aspect of the present invention, the other spring end of the spring member is housed in a long hole formed in the lid, and the spring member and the lid are linked.

Effect of the Invention

According to the present invention, while ensuring a large torque relative to this type of lid in the maximum open position, the situation wherein the lid is suddenly closed can be prevented from occurring as little as possible by reducing the torque at the time of the closing operation of the lid.

BEST MODES OF CARRYING OUT THE INVENTION

Hereinafter, based on FIG. 1 to FIG. 12, a typical embodiment of the present invention will be explained. In an urging structure for a lid according to the embodiment, while ensuring a large torque in a maximum open position relative to a lid 5 turnably combined relative to a supply-port-forming member 4 provided in an automobile and forming an energy supply port 1, and closing the energy supply port 1 in a closed position, a situation wherein the lid 5 is suddenly closed is prevented from occurring as little as possible by reducing the torque at a time of a closing operation of the lid 5.

In the maximum open position, it is desirable to apply the torque as large as possible toward an opening direction relative to the lid 5 so that the lid 5 does not easily move to the closed position only by some unexpected external force applied to the lid 5 (the first requirement). On the other hand, at the time of the closing operation of the lid 5, it is not preferable that the lid 5 is suddenly closed (a second requirement). When this occurs, an impact sound and the like is generated to damage a high-quality feeling of the automobile, and the like. In the urging structure for the lid 5 according to the embodiment, with a single spring member 16, while respectively urging the lid 5 in a closing direction in the closed position, and in the opening direction in the maximum open position, the torque relative to the lid 5 is ensured to be as large as possible in the maximum open position, and the torque is reduced at the time of the closing operation of the lid 5 so as to satisfy both the first and second requirements.

The lid 5 is for closing the energy supply port 1 of the automobile (a fuel filling aperture of the automobile, an electric supply port of an EV (an electric vehicle) or a PHEV (a plug-in hybrid electric vehicle), and a hydrogen filling port of an FCV (a fuel cell vehicle)).

The supply-port-forming member 4 is attached to a body of the automobile, and forms the energy supply port 1.

Figure 2:
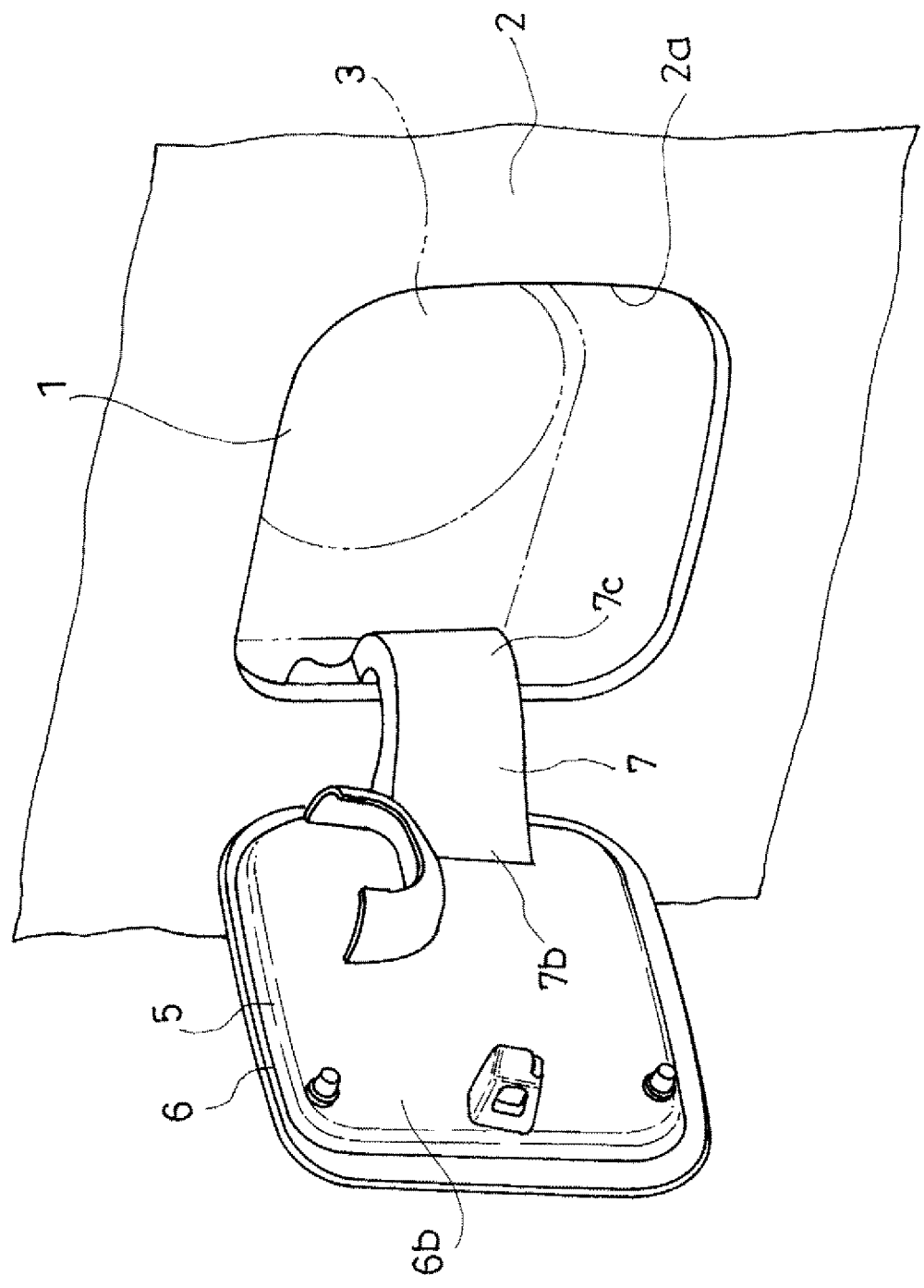
FIG. 2 is a perspective view showing the use state of the one embodiment of the present invention, and the lid is in a maximum open position.
Figure 3:
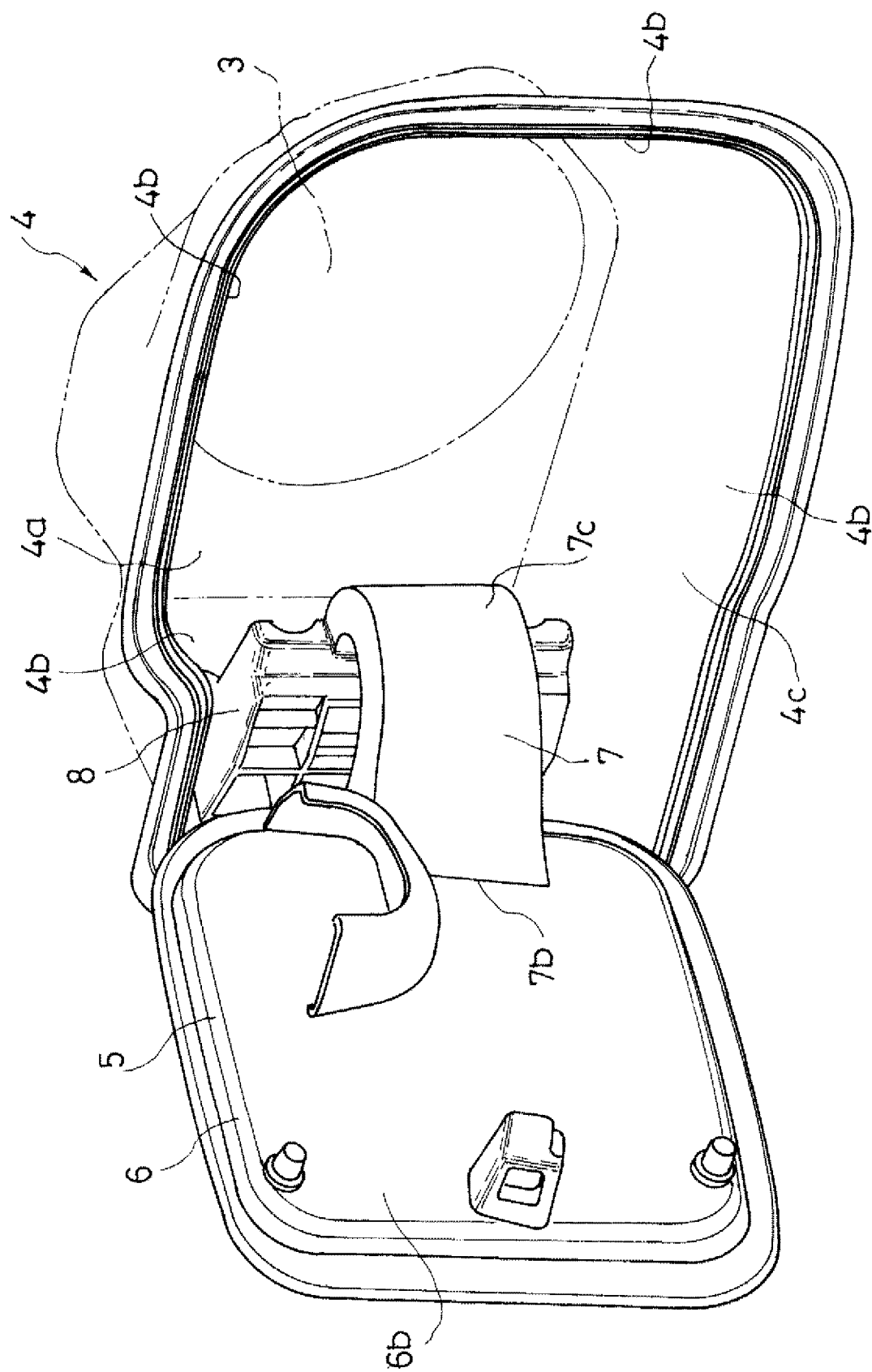
FIG. 3 is a perspective view of the one embodiment of the present invention, and the lid is in the maximum open position.
Figure 4:
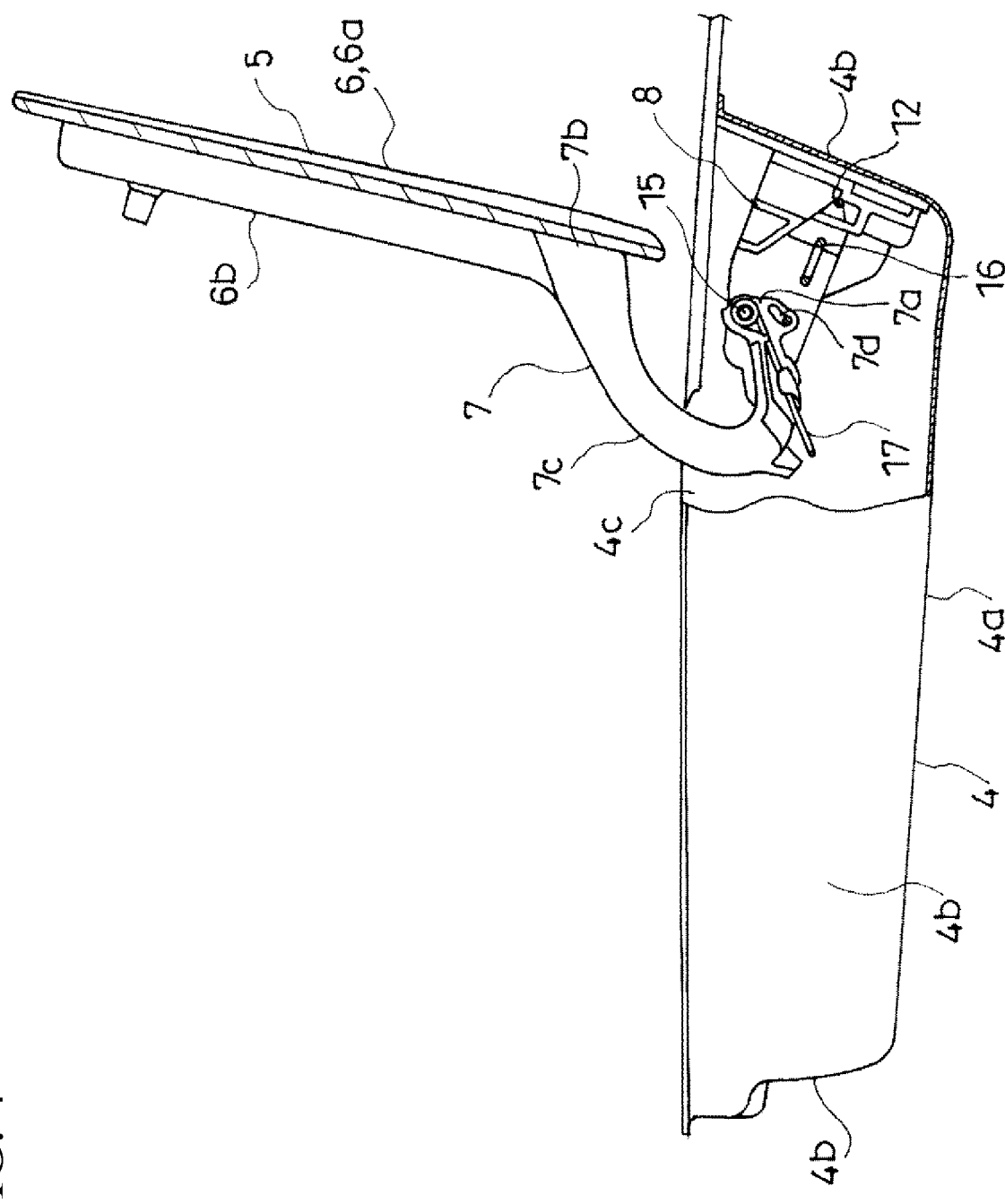
FIG. 4 is an exploded side view of essential parts of the one embodiment of the present invention, and the lid is in the maximum open position.

In an illustrated example, as shown in FIG. 3 and FIG. 4, the supply-port-forming member 4 has a bottom portion 4a and four side walls 4b surrounding the bottom portion 4a, and is attached to the body of the automobile in such a way so as to position an insertion port (omitted in the drawings) of a nozzle of a fuel feed gun into an upper end portion of a fuel tube in the bottom portion 4a, open on a side opposite to the bottom portion 4a, and communicate an open portion 4c having a substantially square-shaped open port edge portion with an open portion 2a of a body panel 2. In FIG. 2, the reference 3 represents a cap closing the insertion port.

Figure 1:
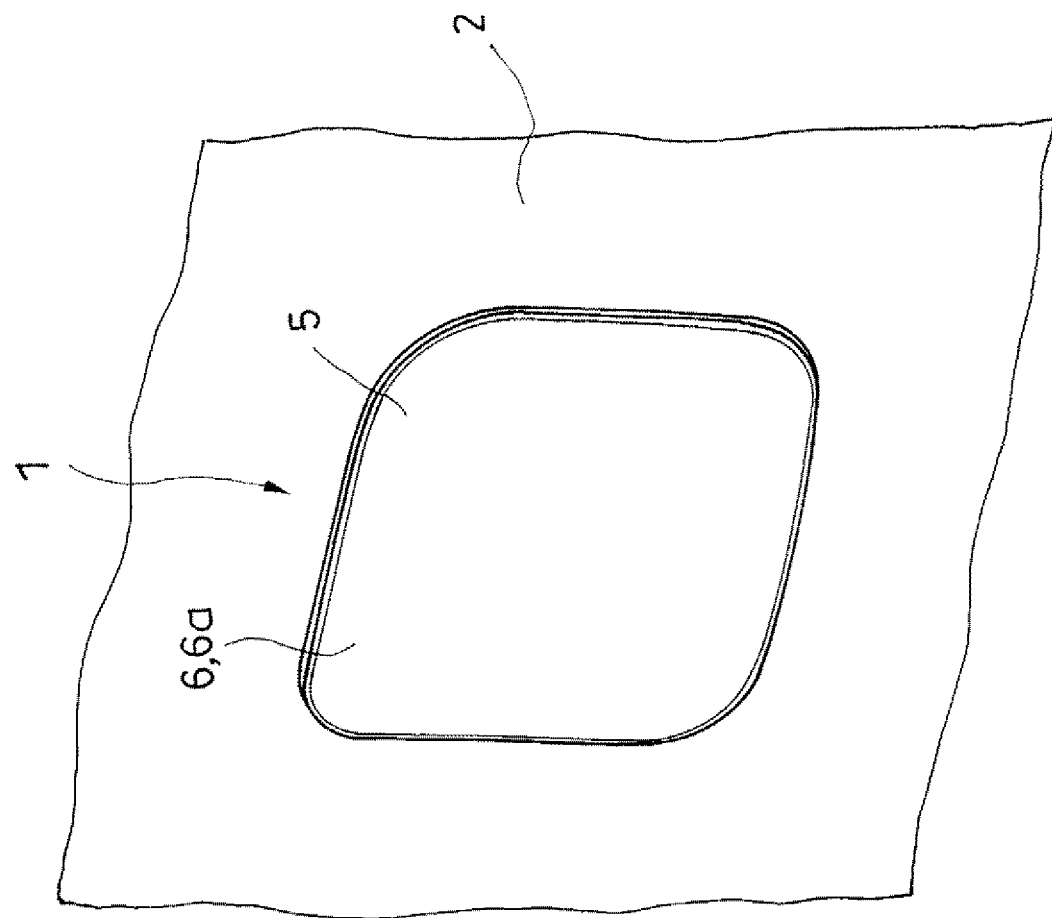
FIG. 1 is a perspective view showing a use state of one embodiment of the present invention, and a lid is in a closed position.

The lid 5 closes the open portion 4c in the closed position, and allows an outer face 6a of a lid main member 6 thereof to continue to an outer face of the body panel 2 (FIG. 1).

In the illustrated example, the lid 5 comprises the lid main member 6 having a square plate shape having an outline shape following the open port edge portion of the open portion 4c; and an arm 7 linking between the lid main member 6 and the supply-port-forming member 4.

Figure 5:
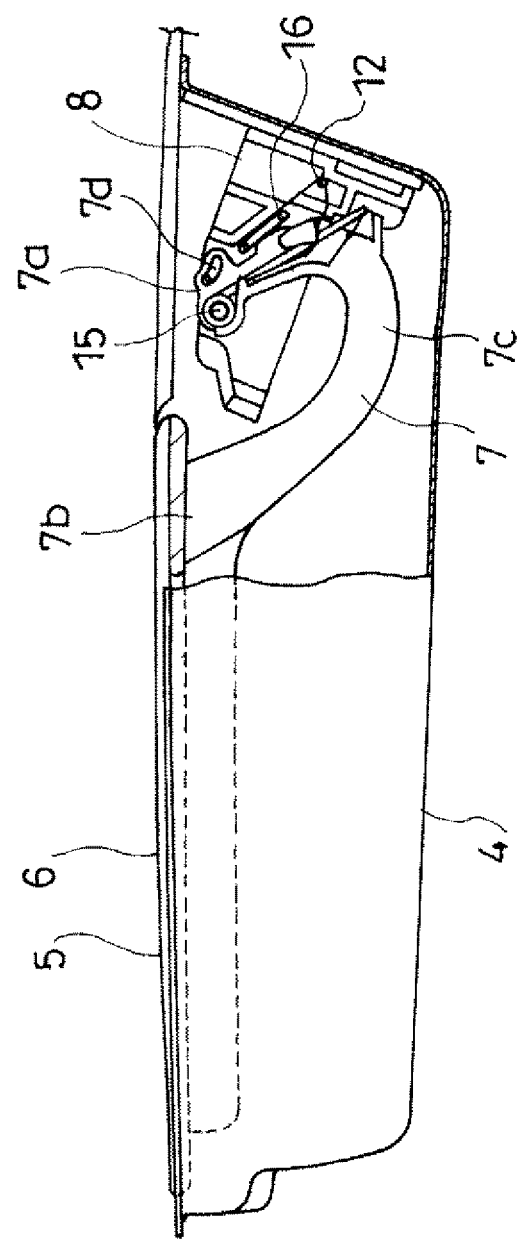
FIG. 5 is an exploded side view of the essential parts of the one embodiment of the present invention, and the lid is in the closed position.

The arm 7 has a structure wherein one arm end 7a is positioned at a side of one of two vertical side portions of the lid main member 6, the other arm end 7b is integrated with an inner face of the lid main member 6 at one of the two vertical side portions, and an intermediate portion 7c between the one arm end 7a and the other arm end 7b is curbed in such a way so as to make a bottom-portion 4a side of the supply-port-forming member 4 a curve outside in a state wherein the lid 5 is in the closed position (FIG. 5). Both one arm end 7a and the other arm end 7b of the arm 7 are positioned on an open-portion 4c side of the supply-port-forming member 4 in the state wherein the lid 5 is in the closed position (FIG. 5).

Inside one of two vertical side walls 4b in the supply-port-forming member 4, there is formed a support portion 8 for one arm end 7a of the arm 7.

Figure 6:
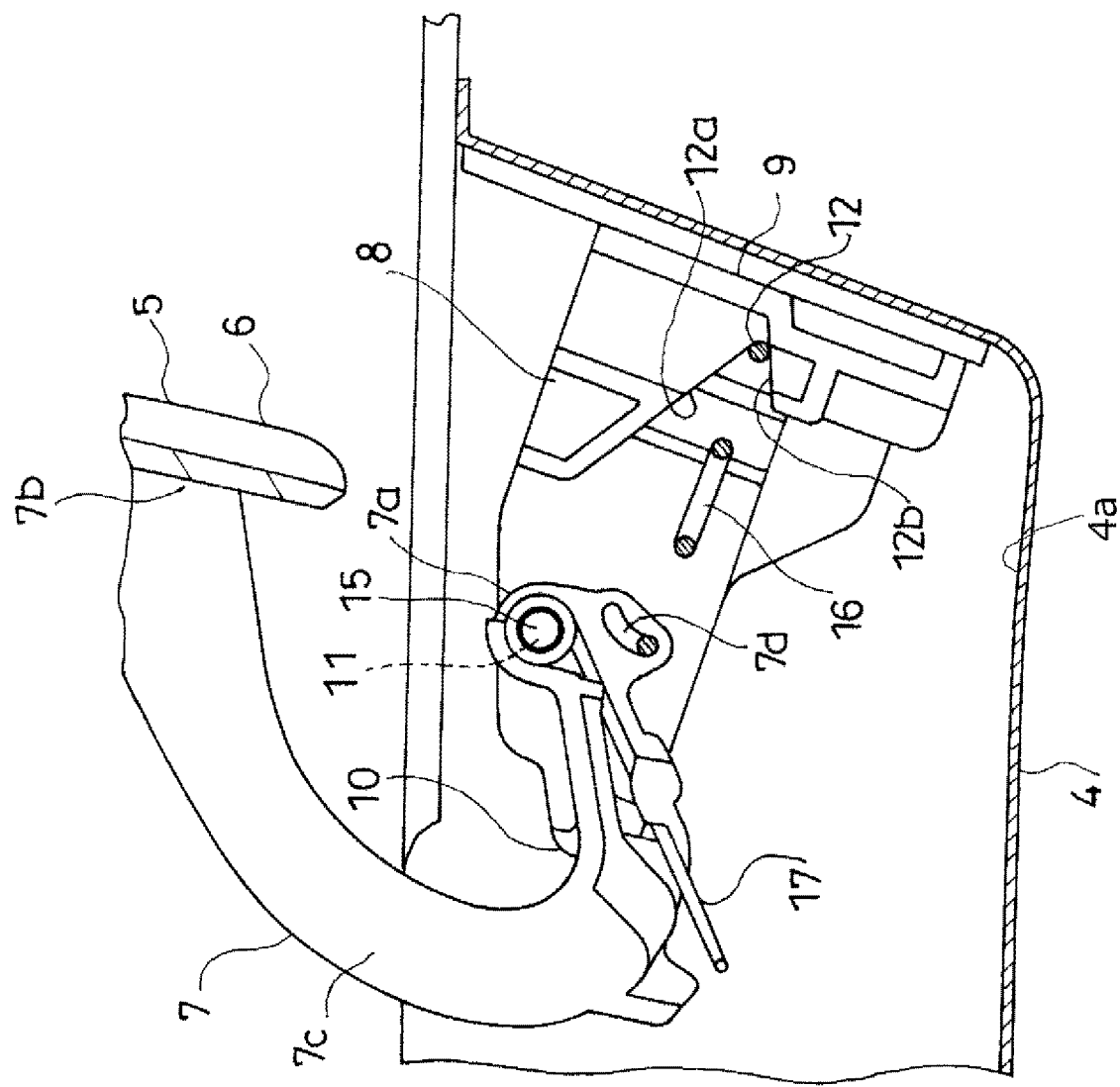
FIG. 6 is an enlarged structural view of the essential parts in the state in FIG. 4.
Figure 7:
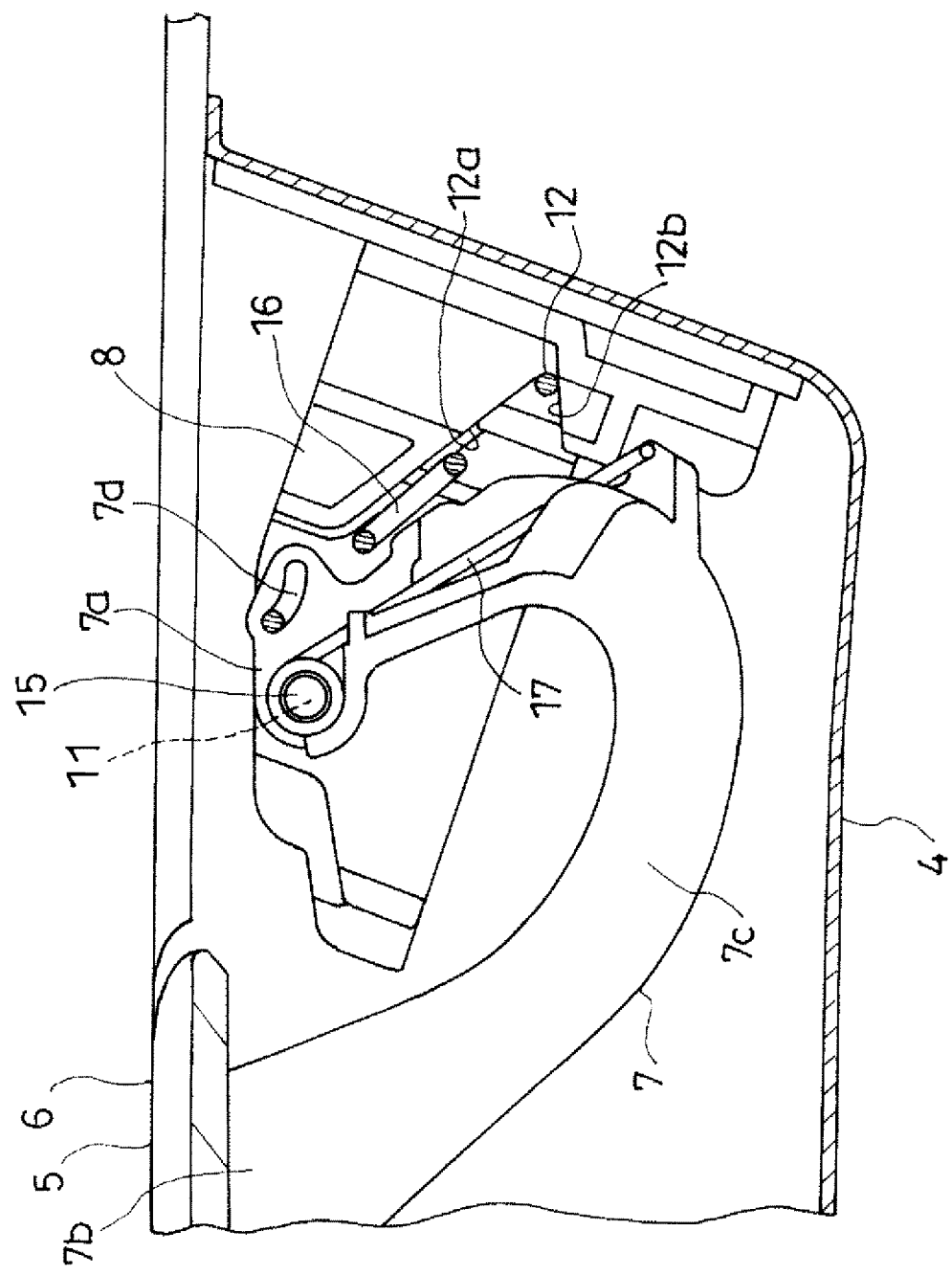
FIG. 7 is an enlarged structural view of the essential parts in the state in FIG. 5.

The support portion 8 comprises a fixation portion 9 relative to one of the two vertical side walls 4b; a tip portion 10 positioned in the vicinity of one of the two vertical side portions of the lid main member 6 in the state wherein the lid 5 is in the closed position (FIG. 5); a bearing portion 11 formed on the tip-portion 10 side; and a spring receiving portion 12 formed on the fixation-portion 9 side (FIG. 6).

The bearing portion 11 turnably combines one arm end 7a of the arm 7 relative to the support portion 8, i.e. the supply-port-forming member 4 by a shaft member 15 wherein a shaft center line is disposed vertically.

The spring receiving portion 12 is formed by a first wall 12a formed between the bearing portion 11 and the fixation portion 9 in the support portion 8, and facing the bottom portion 4a of the supply-port-forming member 4; and a second wall 12b positioned on the bottom-portion 4a side relative to the first wall 12a and facing the open portion 4c of the supply-port-forming member 4.

The first wall 12a and the second wall 12b are formed in such a way so as to gradually reduce a distance between both walls as approaching from a bearing-portion 11 side to the fixation-portion 9 side, and the first wall 12a and the second wall 12b intersect in such a way so as to form a V shape in a plan view on the fixation-portion 9 side. The spring receiving portion 12 is formed by an intersection portion of the first wall 12a and the second wall 12b.

Figure 8:
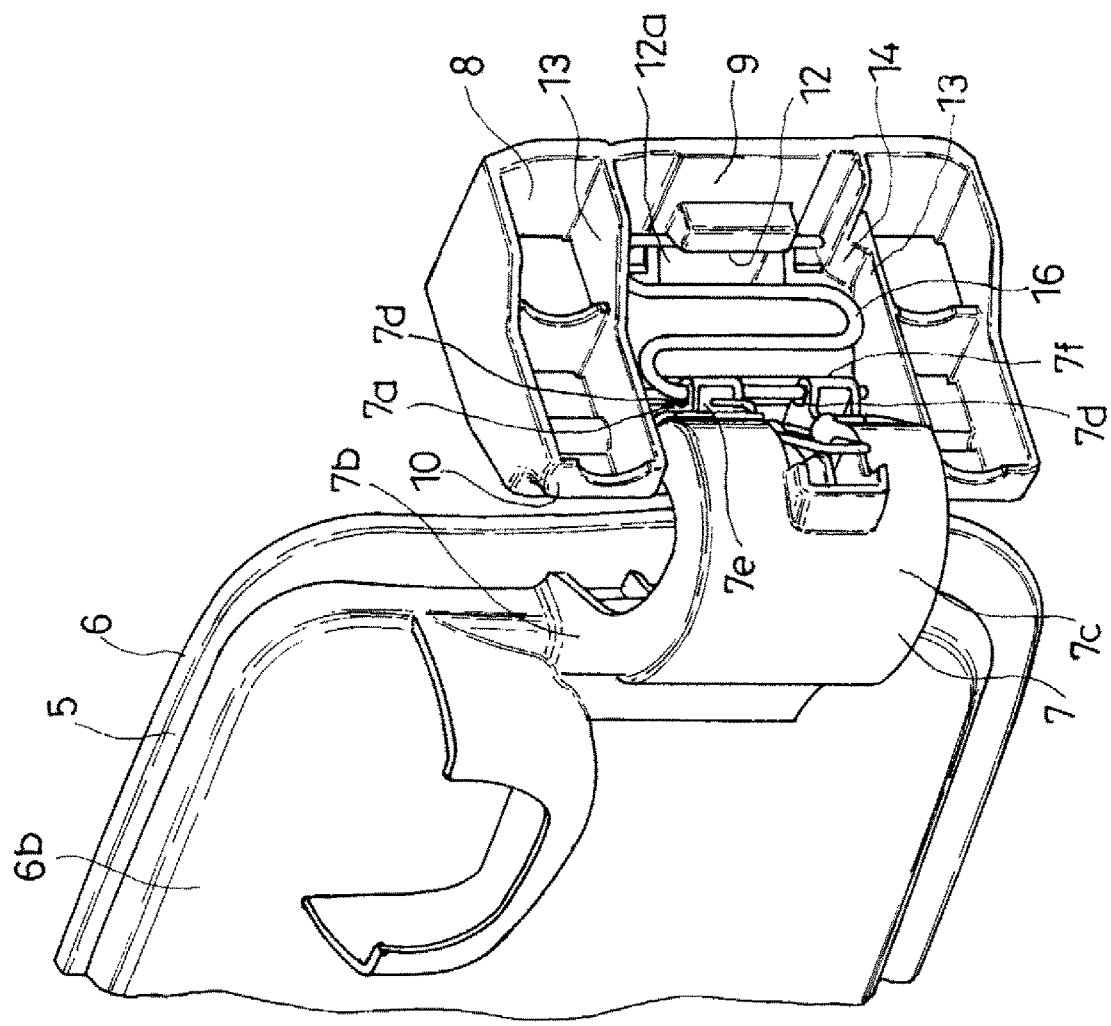
FIG. 8 is a perspective view of the essential parts of the one embodiment of the present invention.

In the illustrated example, as shown in FIG. 8, an inner part of the support portion 8 is sectioned into three parts in an up-and-down direction by two partition walls 13 and 13 formed along a crosswise direction. An up-and-down size of an intermediate chamber 14 between the two partition walls 13 and 13 in the inner part of the support portion 8 is substantially equal to an up-and-down size of the arm 7, and one arm end 7a of the arm 7 is housed inside the intermediate chamber 14 and turnably combined with the support portion 8 by the shaft member 15. The first wall 12a, the second wall 12b, and the spring bearing portion 12 are formed inside the intermediate chamber 14, and furthermore, the spring member 16 is housed.

In the spring member 16, one spring end 16a is linked to the supply-port-forming member 4, and the other spring end 16b is linked to the lid 5. Also, the spring member 16 is provided in such a way as to be most elastically deformed in an intermediate position between the closed position and the maximum open position of the lid 5, and urges the lid 5.

Figure 9:
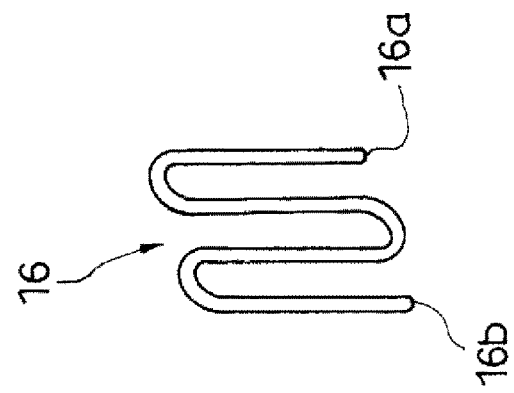
FIG. 9 is a perspective view of a spring member.

In the illustrated example, the spring member 16 is formed by molding a wire rod in an S shape (FIG. 9). The spring member 16 is interposed between one arm end 7a of the arm 7 and the support portion 8 in a state wherein both one spring end 16a and the other spring end 16b are substantially in parallel to the shaft center line of the shaft member 15 (FIG. 8).

In the illustrated example, one spring end 16a of the spring member 16 is housed in the spring receiving portion 12 in such a way so as to be pressed against the spring receiving portion 12 from the bearing-portion 11 side, and is positioned in the spring receiving portion 12.

Also, the other spring end 16b of the spring member 16 is housed in a long hole 7d formed in a side of an insertion hole 15a of the shaft member 15 formed in one arm end 7a. In the illustrated example, herein, the spring member 16 and the lid 5 are linked.

In the illustrated example, a forming portion of the long hole 7d in one arm end 7a is divided into upper and lower parts, and long holes 7d are formed respectively in an upper portion 7e and a lower portion 7f. The other spring end 16b of the spring member 16 has a structure of fitting into the long hole 7d of the lower portion 7f through the long hole 7d of the upper portion 7e (FIG. 8).

Also, the spring member 16 is linked to the lid 5 in such a way so as to vary a distance between the other spring end 16b and a turning center of the lid 5, i.e. the shaft member 15.

In the illustrated example, a width of the long hole 7d is substantially equal to a thickness of the other spring end 16b of the spring member 16; however, a length of the long hole 7d is greater than the thickness of the other spring end 16b. Also, one end 7d' of the long hole 7d is positioned on an arc of an imaginary first circle r1 around the insertion hole 15a; however, the other end 7d" of the long hole 7d is positioned on an arc of an imaginary second circle r2 having a diameter greater than that of the imaginary first circle r1 around the insertion hole 15a (FIG. 12).

Then, the aforementioned distance stays constant when the lid 5 is in the closed position and in the intermediate position, increases in a process of moving from the intermediate position to the maximum open position, and becomes maximum when the lid 5 is in the maximum open position.

Figure 11:
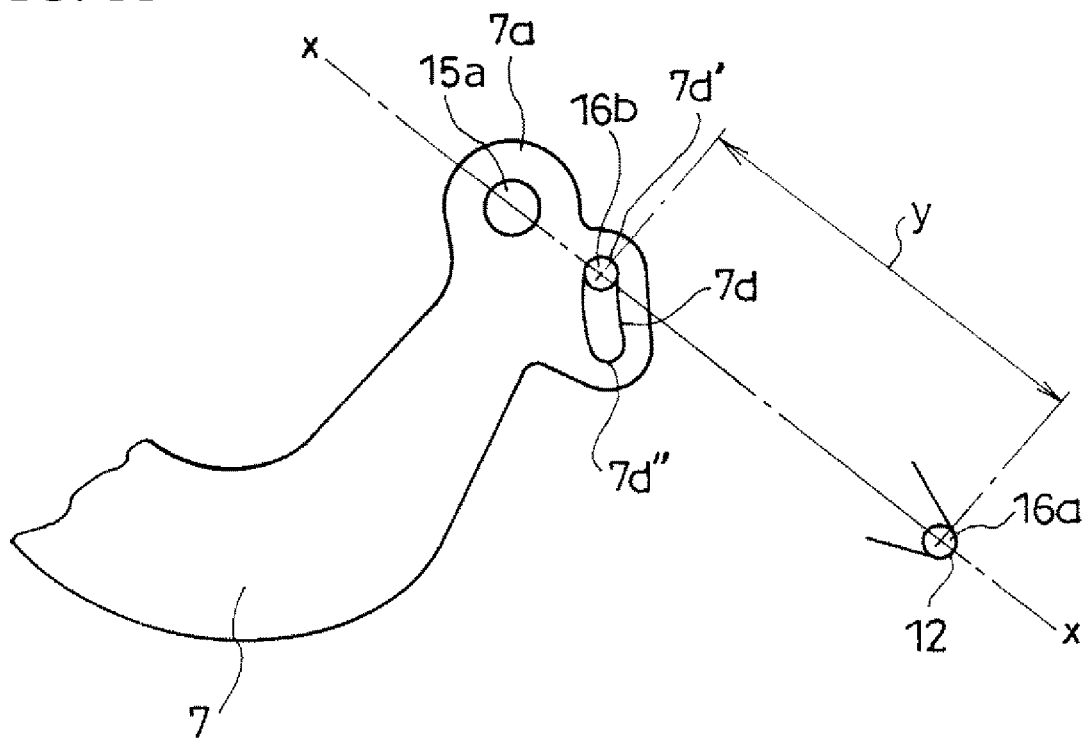
FIG. 11 is a side structural view of the essential parts when the lid is in an intermediate position.

When the lid 5 is in the intermediate position, the insertion hole 15a, one end 7d' of the long hole 7d, and the spring receiving portion 12 are positioned on an imaginary straight line x connecting the insertion hole 15a and the spring receiving portion 12 in such a way so as to position one end 7d' of the long hole 7d between the insertion hole 15a and the spring receiving portion 12, and a distance y between one spring end 16a and the other spring end 16b of the spring member 16 becomes shortest (FIG. 11). Therefore, the spring member 16, which is most elastically deformed, presses the other spring end 16b against one end 7d' of the long hole 7d.

Figure 12:
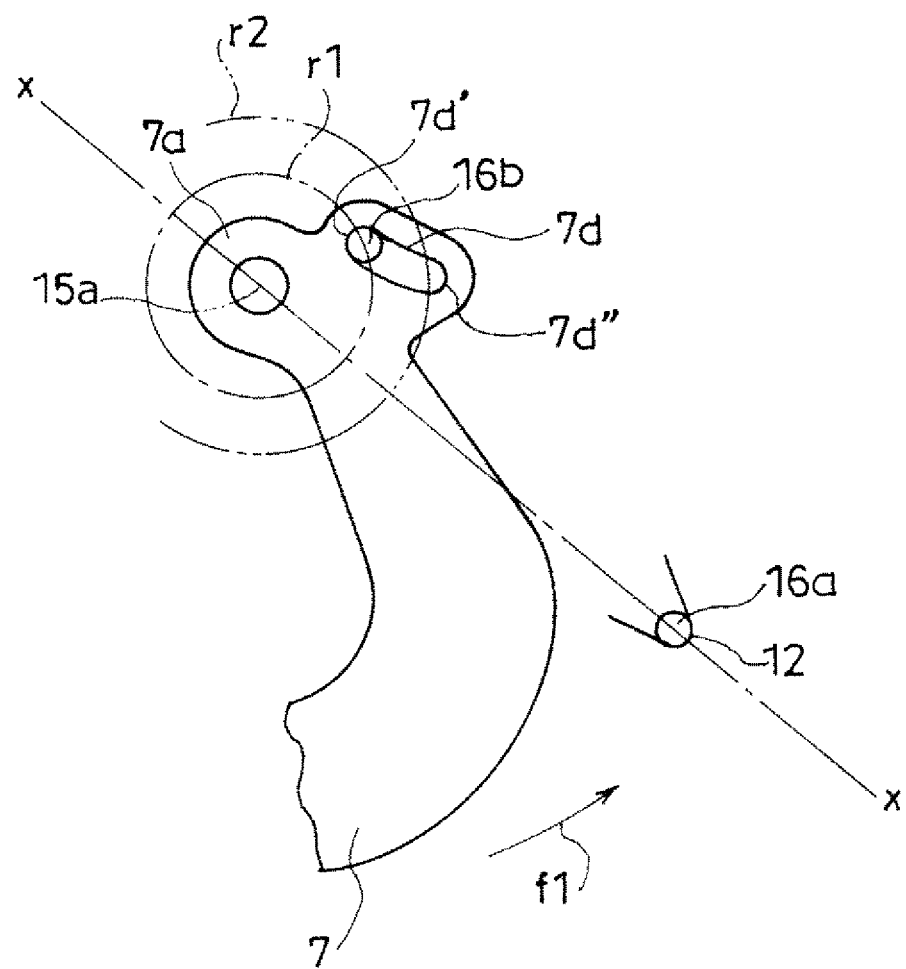
FIG. 12 is a side structural view of the essential parts when the lid is in the closed position.

When the lid 5 is in the closed position, the long hole 7d is positioned on the right in FIG. 12 sandwiching the imaginary straight line x; however, at that time, a distance between one end 7d' of the long hole 7d and the spring receiving portion 12 becomes longer than a distance between the other end 7d" of the long hole 7d and the spring receiving portion 12 (FIG. 12). Therefore, at that time as well, the spring member 16 presses the other spring end 16b against one end 7d' of the long hole 7d. As the lid 5 located in the closed position moves to the intermediate position, the distance between one end 7d' of the long hole 7d and the spring receiving portion 12 becomes narrow, so that when the lid 5 is in the closed position, a force in a direction of closing the lid 5 shown by the reference f1 in FIG. 12 is applied to the lid 5 by the spring member 16.

Figure 10:
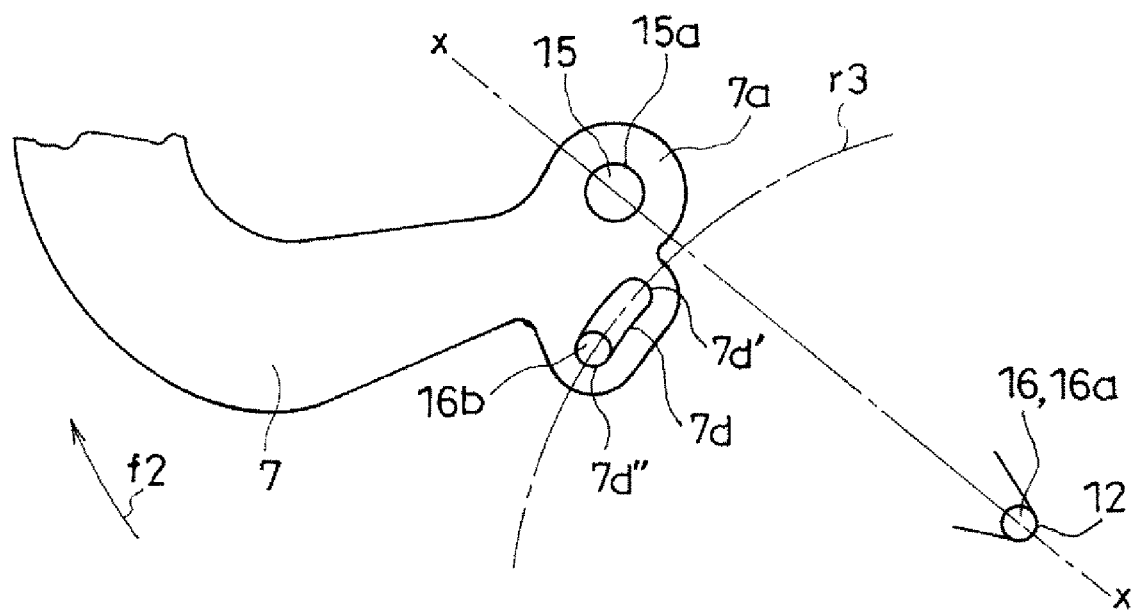
FIG. 10 is a side structural view of the essential parts when the lid is in the maximum open position.

When the lid 5 is in the maximum open position, the long hole 7d is positioned on the left in FIG. 10 sandwiching the imaginary straight line; however, at that time, both one end 7d' and the other end of the long hole 7d are positioned substantially on an arc of an imaginary circle r3 around the spring receiving portion 12 (FIG. 10). As the lid 5 located in the maximum open position moves to the intermediate position, a distance between the long hole 7d and the spring receiving portion 12 becomes narrow, so that when the lid 5 is in the maximum open position, a force in a direction of opening the lid 5 shown by the reference f2 in FIG. 10 is applied to the lid 5 by the spring member 16. Therefore, when the lid 5 is operated to open toward the maximum open position beyond the intermediate position, the other spring end 16b of the spring member 16 moves to the other end side from one end 7d' of the long hole 7d by the force in the opening direction, and in the maximum open position, the spring member 16 presses the other spring end 16b against the other end 7d" of the long hole 7d by the force in the opening direction.

A distance between the other end 7d" of the long hole 7d and the insertion hole 15a is longer than a distance between one end 7d' of the long hole 7d and the insertion hole 15a. Therefore, in the maximum open position, the torque to be applied to the lid 5 is maximized so as to satisfy the first requirement.

When the lid 5 located in the maximum open position is operated to be closed, the long hole 7d changes a direction in such a way so as to gradually reduce the distance between the other end 7d" of the long hole 7d and the spring receiving portion 12, and when the lid 5 reaches the intermediate position, the distance between one end 7d' of the long hole 7d and the spring receiving portion 12 becomes longer than the distance between the other end 7d" of the long hole 7d and the spring receiving portion 12. Thereby, when the lid 5 reaches the intermediate position, the other spring end 16b of the spring member 16 returns to one end 7d' of the long hole 7d, and a distance between the other spring end 16b and the insertion hole 15a becomes short. Therefore, a torque of the spring member 16 is reduced between the intermediate position and the closed position so as to satisfy the second requirement.

Incidentally, in the illustrated example, in the state wherein the lid 5 is in the closed position, the lid 5 is locked by a lock device which is not shown in the drawings. When the lock device is unlocked, by an urging force of an additional spring member shown by the reference 17 in FIG. 4, a free end side of the lid 5 slightly lifts. An opening operation of the lid 5 located in the closed position is carried out by hooking one's finger on a free end of the lid 5 which is slightly lifted as mentioned above, and the like.

EXPLANATION OF SYMBOLS 4 a supply-port-forming member
5 a lid
16 a spring member
16a one spring end
16b the other spring end Incidentally, all contents of the specification, claims, drawings, and abstract of Japanese Patent Application No. 2017-161817 filed on Aug. 25, 2017 are cited in their entireties herein and are incorporated as a disclosure of the specification of the present invention.

What is claimed is:

1. An urging structure for a lid turnably assembled relative to a supply-port-forming member provided in an automobile and forming an energy supply port, and closing the supply port in a closed position, comprising:
    a spring member having one spring end linked to the supply-port-forming member and another spring end movably linked to the lid, and provided in such a way so as to be most elastically deformed at an intermediate position between the closed position and a maximum open position of the lid to urge the lid,
    wherein the spring member is linked to the lid so as to vary a distance between the another spring end and a turning center of the lid, and
    the distance stays constant when the lid is in the closed position and in the intermediate position, increases in a process of moving from the intermediate position to the maximum open position, and becomes maximum when the lid is in the maximum open position.

2. An urging structure for a lid according to claim 1, wherein the another spring end of the spring member is housed in a long hole formed in the lid so that the spring member and the lid are movably linked.

* * * * *